US010024430B2

(12) United States Patent
Spooner et al.

(10) Patent No.: US 10,024,430 B2
(45) Date of Patent: Jul. 17, 2018

(54) PARK LOCK APPARATUS

(71) Applicant: JAGUAR LAND ROVER LIMITED, Warwickshire (GB)

(72) Inventors: John Spooner, Coventry (GB); Ged Pybus, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 15/519,193

(22) PCT Filed: Oct. 8, 2015

(86) PCT No.: PCT/EP2015/073210
§ 371 (c)(1),
(2) Date: Apr. 14, 2017

(87) PCT Pub. No.: WO2016/058894
PCT Pub. Date: Apr. 21, 2016

(65) Prior Publication Data
US 2017/0234428 A1 Aug. 17, 2017

(30) Foreign Application Priority Data
Oct. 17, 2014 (GB) .................................. 1418437.8

(51) Int. Cl.
*F16H 63/34* (2006.01)
*B60T 1/00* (2006.01)
*B60K 17/346* (2006.01)

(52) U.S. Cl.
CPC ....... *F16H 63/3441* (2013.01); *B60K 17/346* (2013.01); *B60T 1/005* (2013.01); *F16H 63/3425* (2013.01)

(58) Field of Classification Search
None
See application file for complete search history.

(56) References Cited

U.S. PATENT DOCUMENTS

| 2,962,916 | A | 12/1960 | Koelsch |
| 3,963,085 | A | 6/1976 | Vinton |
| 2016/0097443 | A1* | 4/2016 | Larsson ................. F16H 48/34 475/150 |

FOREIGN PATENT DOCUMENTS

| DE | 3921323 A1 | 6/1990 |
| DE | 102006046712 A1 | 4/2008 |
| DE | 102010053505 A1 | 6/2012 |

OTHER PUBLICATIONS

Combined Search and Examination Report under Sections 17 and 18(3) for Application No. GB 1418437.8 dated Apr. 10, 2015.
(Continued)

*Primary Examiner* — Jacob S. Scott
(74) *Attorney, Agent, or Firm* — Carlson, Gaskey & Olds

(57) ABSTRACT

A park lock apparatus and control unit for a vehicle, the apparatus comprising: a locking member (28, 30; 50) having: a first state arranged to permit independent rotational movement of front and rear drive shafts (20, 22) of the vehicle relative to a fixed position on the vehicle; a second state arranged to prevent independent rotational movement of the front and rear drive shafts of the vehicle relative to the fixed position on the vehicle; and a third state arranged to prevent rotational movement of the front and rear drive shafts of the vehicle relative to the fixed position on the vehicle, and an actuation member (36; 64) for moving the locking member between the first, second and third states.

13 Claims, 6 Drawing Sheets

(56) References Cited

OTHER PUBLICATIONS

International Search Report and Written Opinion of the International Searching Authority for International application No. PCT/EP2015/073210 dated Nov. 4, 2015.

* cited by examiner

PARK LOCK APPARATUS

TECHNICAL FIELD

The present disclosure relates to a park lock apparatus and in particular, but not exclusively, to a park lock apparatus for a vehicle. Aspects of the invention relate to an apparatus, to a control unit, to a method and to a vehicle.

BACKGROUND

Vehicles having transmission systems may feature a park lock, which is used to lock the transmission of the vehicle to help to hold the vehicle in a parked configuration. Off road vehicles and the like commonly have a transfer box connected to the transmission via an input drive shaft. The transfer box comprises a differential adapted to transfer motive power from the input drive shaft to the front and/or rear wheels via output drive shafts. A lock can be applied to the transfer box differential so as to restrict the output drive shaft to the front wheels to turn at the same rate as the output drive shaft to the rear wheels.

A driver wishing to park their vehicle might choose to engage the park lock. Failure to apply the vehicle parking brakes or choosing to not apply the parking brakes will normally result in the park lock preventing movement of the vehicle. However, the park lock only prevents movement of the input drive shaft to the transfer box. Thus, in parked conditions where one set of wheels is liable to slip with respect to other set, the transfer box allows movement of one output shaft with respect to the other output shaft even when the park lock is applied. Therefore, it is desirable to lock the transfer box differential when applying park lock but this requires the driver to recognise the conditions and apply each of the park lock and transfer box differential lock.

It is against this background that the invention has been devised. Other aims and advantages of the invention will become apparent from the following description, claims and drawings.

SUMMARY OF THE INVENTION

Aspects of the invention are defined in the appended claims.

In an aspect of the invention there is provided a park lock apparatus for a vehicle, the apparatus comprising:
a locking member having:
a first state arranged to permit independent rotational movement of front and rear drive shafts of the vehicle relative to a fixed position on the vehicle;
a second state arranged to prevent independent rotational movement of the front and rear drive shafts of the vehicle relative to the fixed position on the vehicle; and
a third state arranged to prevent rotational movement of the front and rear drive shafts of the vehicle relative to the fixed position on the vehicle; and
an actuation member for moving the locking member between the first, second and third states.

The locking member may be arranged such that it cannot be moved from the first state to the third state without first being moved to the second state. This may provide the advantage of enabling both drive shafts to be mechanically connected to a park pawl.

Each of the first and second states may permit motive power to be transferred from a transmission of the vehicle to both of the front and rear drive shafts of the vehicle. Both the first and second states may be four-wheel drive states, therefore the first state is a transfer box differential unlocked state and the second state is a transfer box differential locked state. The advantage is that a four wheel drive with a locked transfer box differential means that both drive shafts are locked by the park pawl.

The actuation member may comprise a selector movable between three positions, each position associated with one of the first state, the second state, and both the second and third states. This may provide the advantage of forcing the driver to lock both drive shafts prior to engaging the park pawl.

The first, second and third states of the locking member may comprise respective positions of the locking member.

In an embodiment, the locking member comprises a dog gear movable between a first position and a second position to permit and prevent relative movement of the front and rear drive shafts to move between the first and second states respectively, and a park pawl movable between a first position and a second position to permit and prevent rotational movement of the differential relative to the gearbox to move between the first or second state and the third state respectively.

In an embodiment, the locking member comprises a dog gear movable between a first, second and third position each corresponding to the first, second and third states respectively, wherein:
in the first position the dog gear permits relative movement of the front and rear drive shafts;
in the second position the dog gear prevents relative movement of the front and rear drive shafts;
in the third position the dog gear prevents:
relative movement of the front and rear drive shafts; and
relative movement of the differential and the gearbox.

In an embodiment, the actuation member comprises an actuator connected using a connection to the locking member. The connection may comprise a Bowden cable.

In an embodiment, the apparatus comprises a control unit configured to:
determine relative movement of the first and second drive shafts;
permit movement of the locking member from the first to the second state in dependence on the determined relative movement of the first and second drive shafts;
determine relative movement of the differential to the gearbox; and
permit movement of the locking member from the second state to the third state in dependence on the determined relative movement of the differential to the gearbox.

The movement of the locking member from the first state to the second state may be permitted when there is substantially no relative movement of the first and second drive shafts.

The skilled person will appreciate that substantially no movement is not intended to mean no relative movement at all in all circumstances. Indeed, in some situations, a small relative movement may be required to permit movement of the locking member from the first or second state to the second or third state. This may be the case where the locking member comprises a dog gear and thus requires the engagement of teeth.

The movement of the locking member from the second state to the third state may be permitted when there is substantially no relative movement of the differential and the gearbox.

In an aspect of the invention, there is provided a control unit for a vehicle, the control unit operable to control an actuator to move a locking member between first, second and third states of the locking member, wherein:

the first state of the locking member is arranged to permit independent rotational movement of front and rear drive shafts of the vehicle relative to a fixed position on the vehicle;

the second state of the locking member is arranged to hinder or substantially prevent independent rotational movement of the front and rear drive shafts of the vehicle relative to the fixed position on the vehicle; and the third state of the locking member is arranged to hinder or substantially prevent rotational movement of the front and rear drive shafts of the vehicle relative to the fixed position on the vehicle.

In an aspect of the invention, there is provided a vehicle comprising:

a gearbox connected to a differential for transferring rotational movement from the gearbox to front and/or rear drive shafts; and a park lock apparatus having the features of the park lock apparatus as hereinbefore defined, or the control unit as hereinbefore defined.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

One or more embodiments of the invention will now be described, by way of example only, with reference to the accompanying drawings, in which.

DETAILED DESCRIPTION

Figure 1:
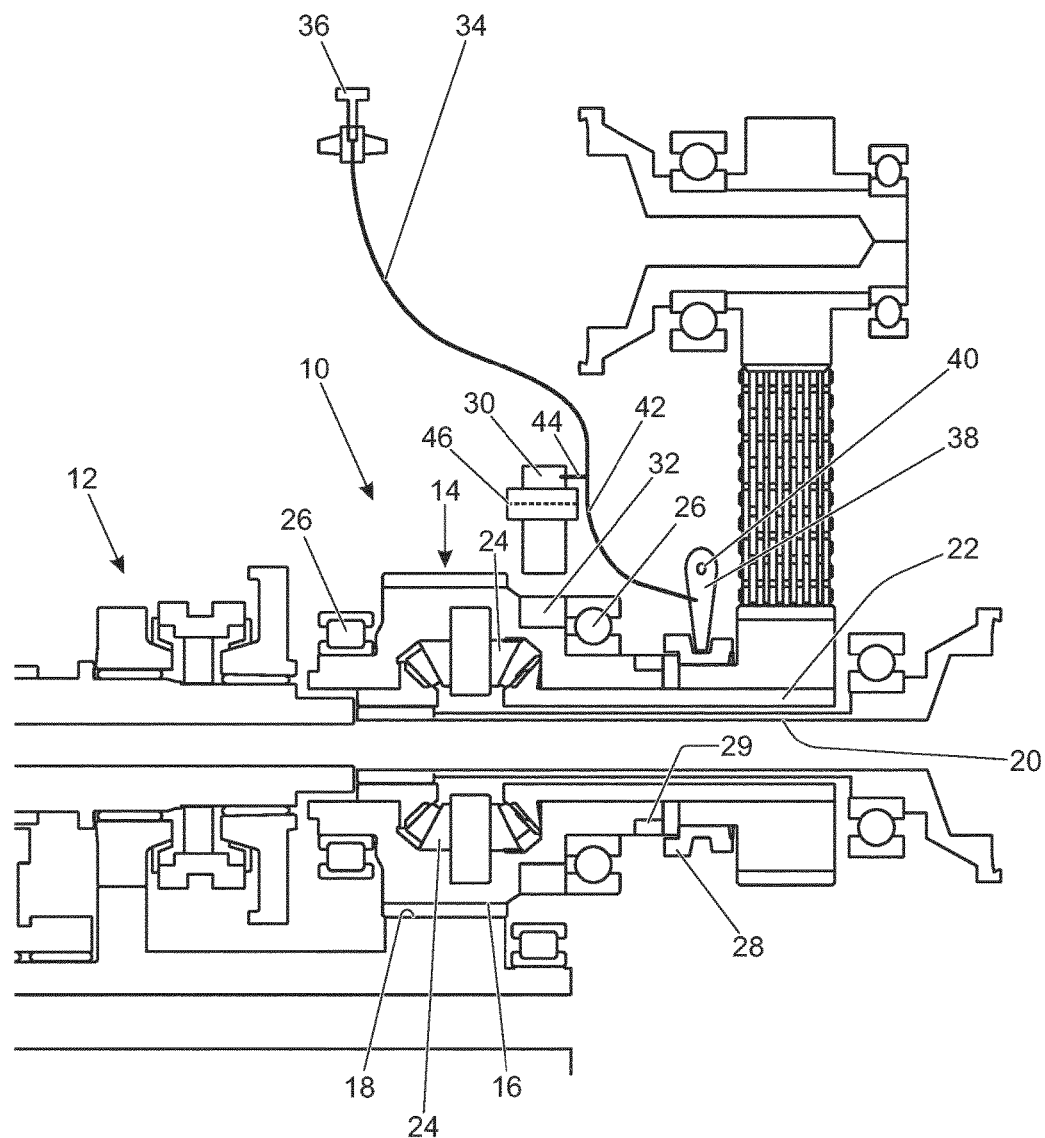
FIG. 1 shows a park lock apparatus according to an embodiment of the invention.

FIG. 1 shows an example embodiment of a park lock apparatus for a vehicle having front and rear wheels. The figure shows a cross-sectional view of a transfer box 10 connected directly to a gearbox 12. The transfer box comprises a differential 14 having a ring gear 16 for mesh engagement with an output gear 18 of the gearbox 12. Bearings 26 support the differential so the ring gear is free to rotate. Motive power is transferred from the gearbox through the ring gear 16 to one or both of a rear wheel drive shaft 20 and a front wheel drive shaft 22, by pinion gears 24 of the differential 14. The differential allows different rotation speeds between the rear wheel drive shaft 20 and the front wheel drive shaft 22.

Figure 2:
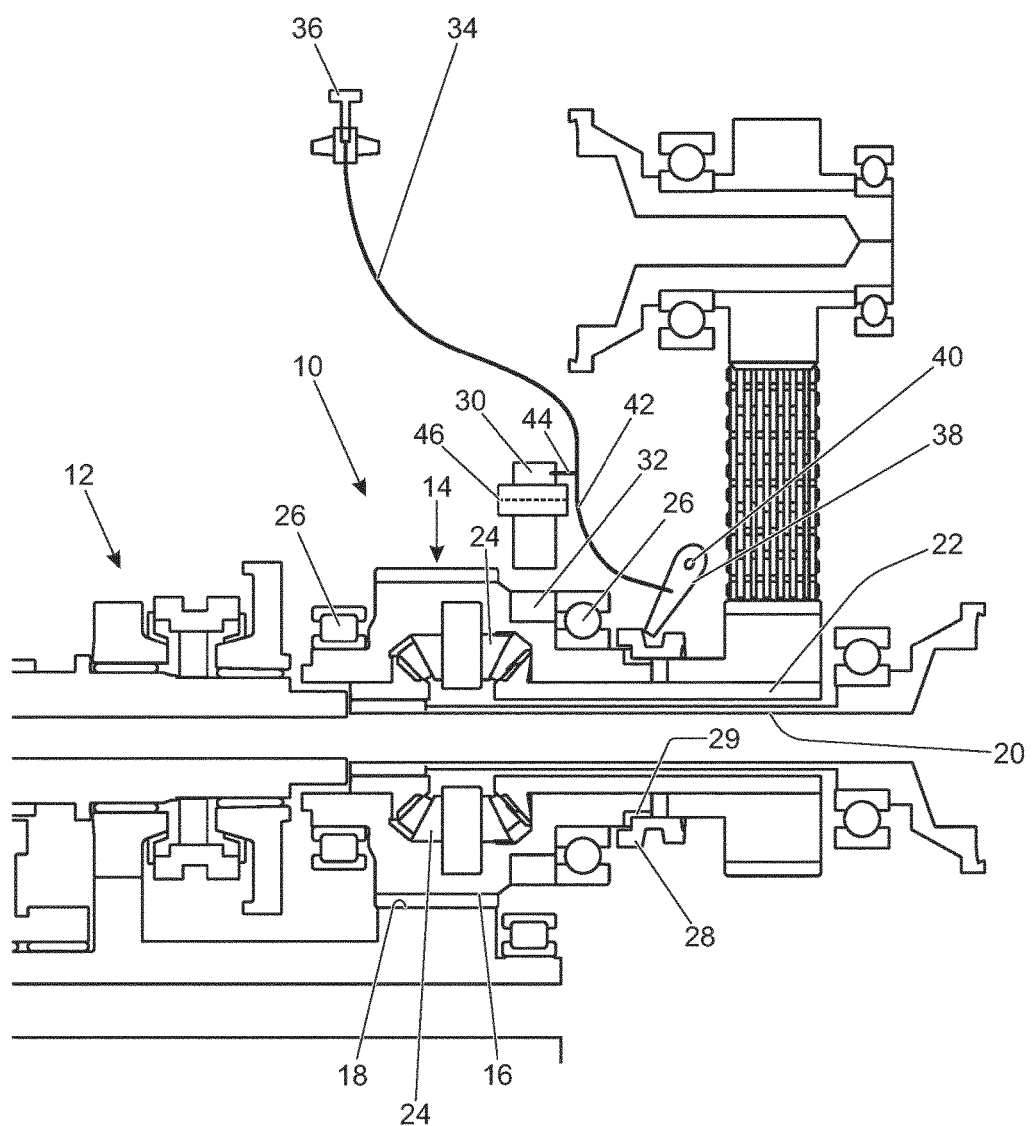
FIG. 2 shows a park lock apparatus according to another embodiment of the invention.

A differential lock 28 is provided in the form of a dog gear. In an unlocked configuration, as shown in FIG. 1, the front wheel drive shaft 22 is free to move independently of the ring gear 16. In a locked configuration, as shown in FIG. 2, the dog gear engages with teeth 29 on the differential so as to lock the front wheel drive shaft 22 to the ring gear 16 and thus prevent independent movement thereof. In turn, this lock causes the rotation of the rear wheel drive shaft 20 to be restricted to that of the front wheel drive shaft 22. Accordingly, when the differential 14 is locked, the front and rear wheels are locked with respect to each other and their independent movement is restricted. It should be noted that this is in the absence of any further differentials positioned between the pairs of wheels on each axle but such differentials are not discussed further herein.

Figure 3:
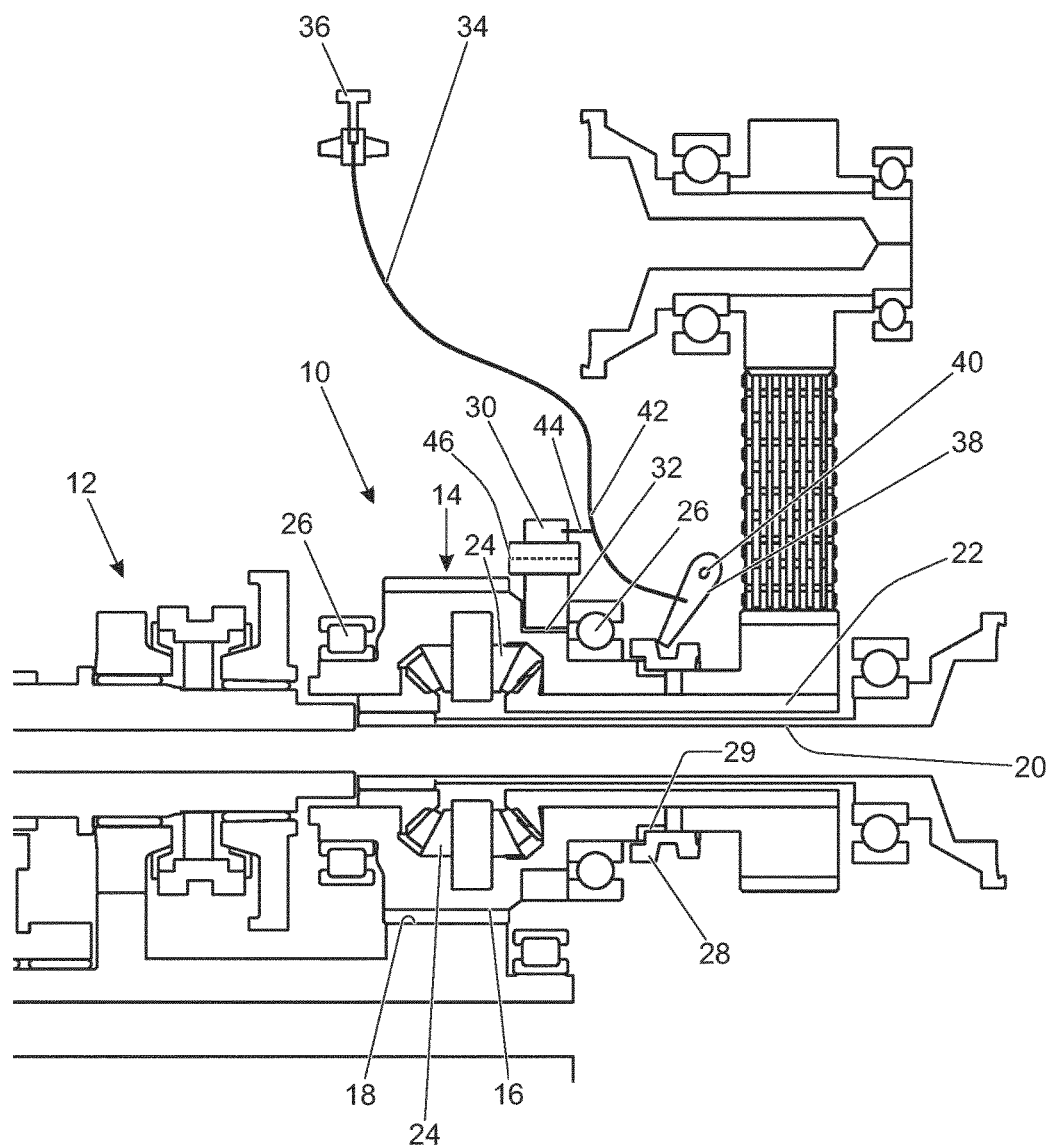
FIG. 3 shows a park lock apparatus according to another embodiment of the invention.

As shown in FIG. 1, a park lock pawl 30 is provided close to the differential for engagement with teeth 32 positioned thereon. Engagement of the pawl 30 with the teeth 32 locks the ring gear 16 of the differential 14 so that the output gear 18 of the transmission 12 cannot rotate. FIG. 3 shows the park lock pawl 30 in the locked configuration.

FIGS. 1 to 3, show a Bowden cable arrangement for engaging the differential lock 28 and the park pawl 30. The arrangement comprises a Bowden cable 34 connected to lever 36 for tensioning and releasing the cable 34. The lever 36 is positioned inside the vehicle cockpit. In example embodiments, the lever is positioned on a dashboard of the vehicle, or near to a gear lever. The Bowden cable 34 is connected to a fork 38 that is moveable to lock and unlock the differential 14. In an example embodiment, actuation of the lever 36 causes tension in the cable which in turn causes the fork to pivot about a point 40 to slide the dog 28 to engage with the teeth 29. Further actuation of the lever causes a catch 42 to engage with a hook 44 to urge the park pawl to engage with the teeth 32 of the differential by, for example, pivoting the park pawl 30 about a point 46. FIG. 1 shows the first stage or state in this process where each of the differential lock and the park pawl are disengaged. FIG. 2 shows the second stage or state of this process where the differential lock is engaged but the park pawl is disengaged. FIG. 3 shows the third stage or state of this process where the differential lock and the park pawl are engaged.

Embodiments of the present invention advantageously provide a park lock apparatus comprising the park pawl 30 and the transfer box differential lock 28 wherein the park pawl cannot be engaged without first locking the differential. This is in contrast to the prior art which permits a park lock pawl to be engaged without locking a transfer box differential. As such the front and rear drive shafts may rotate in opposite directions and so a vehicle parked on a sloped surface of varying mu between the front and back wheel sets, may move on the slope whilst the park lock pawl is engaged.

Figure 4:
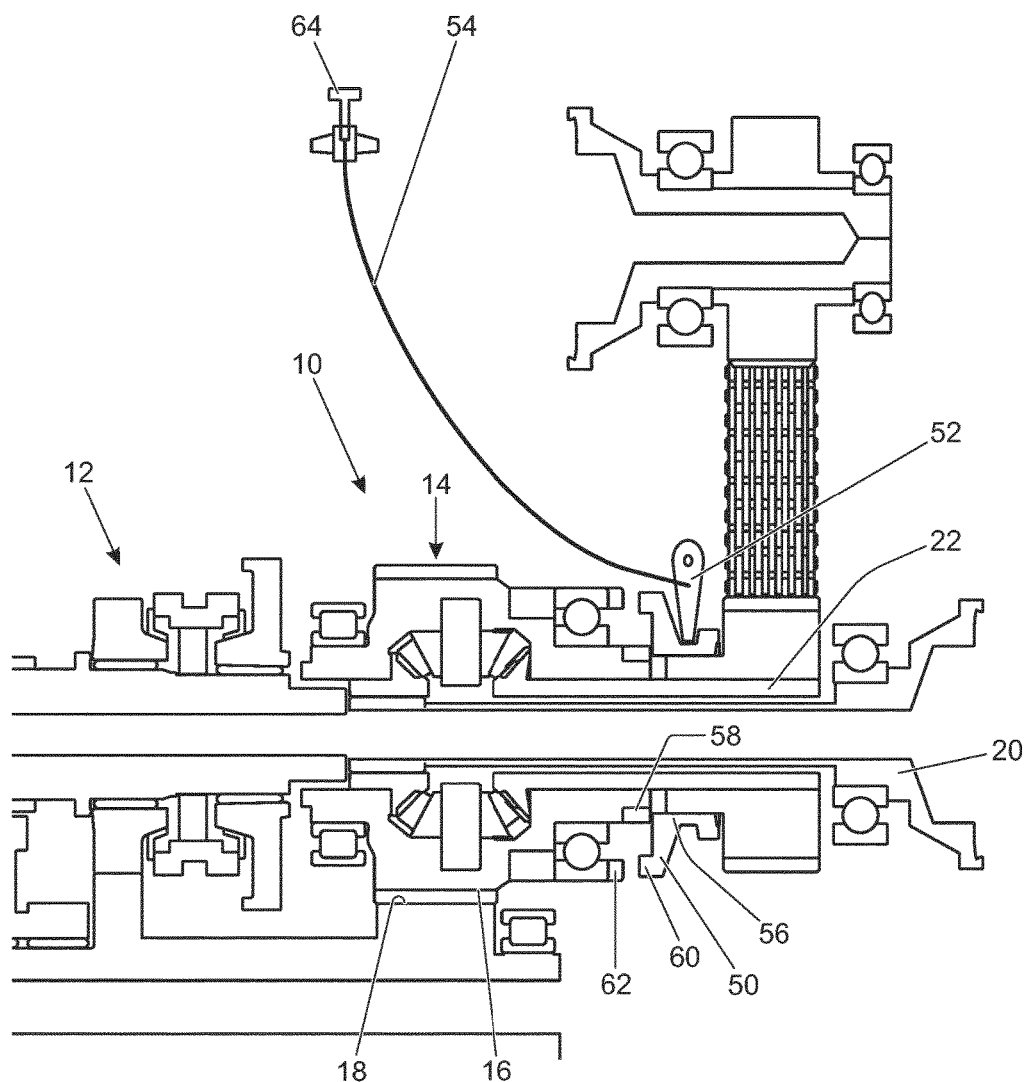
FIG. 4 shows a park lock apparatus according to another embodiment of the invention.
Figure 5:
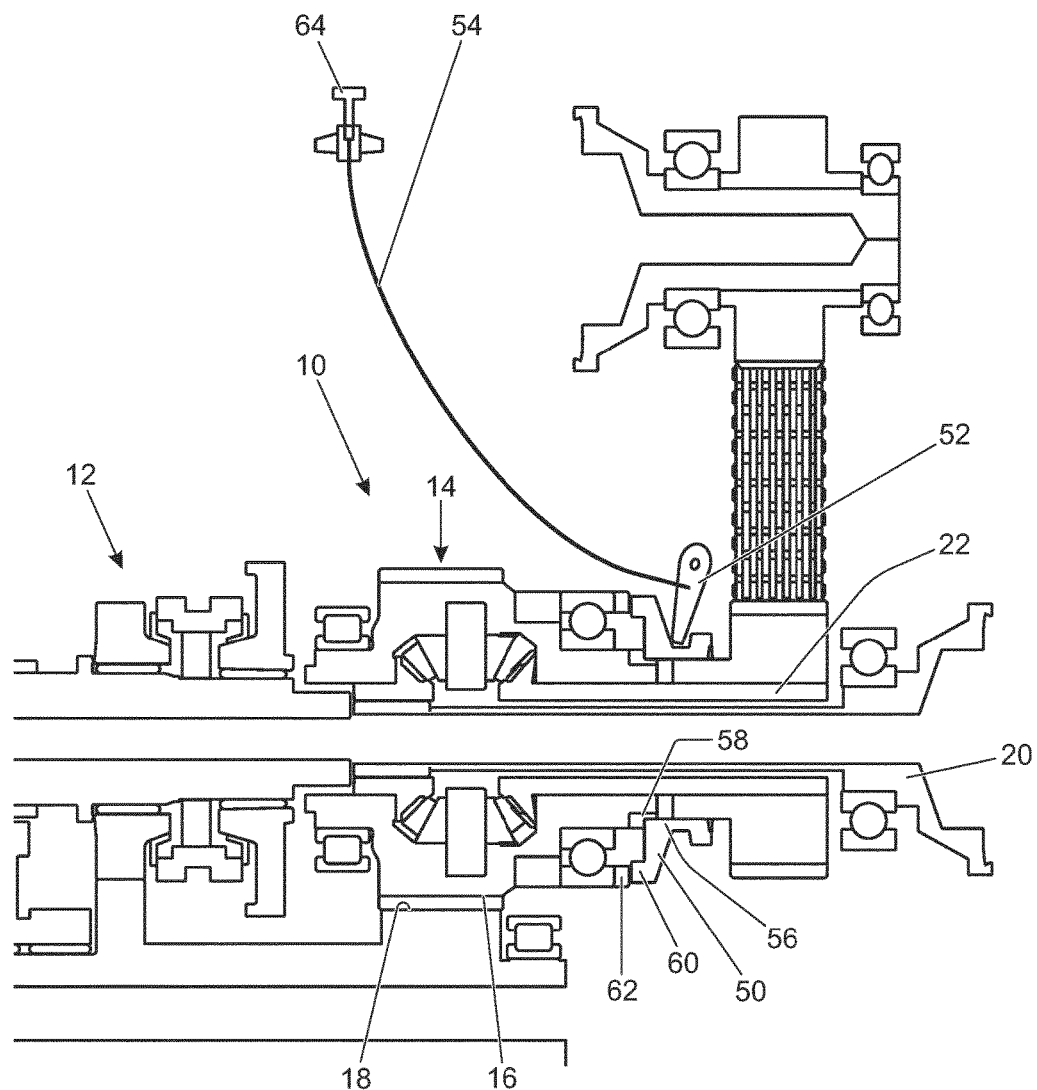
FIG. 5 shows a park lock apparatus according to another embodiment of the invention.
Figure 6:
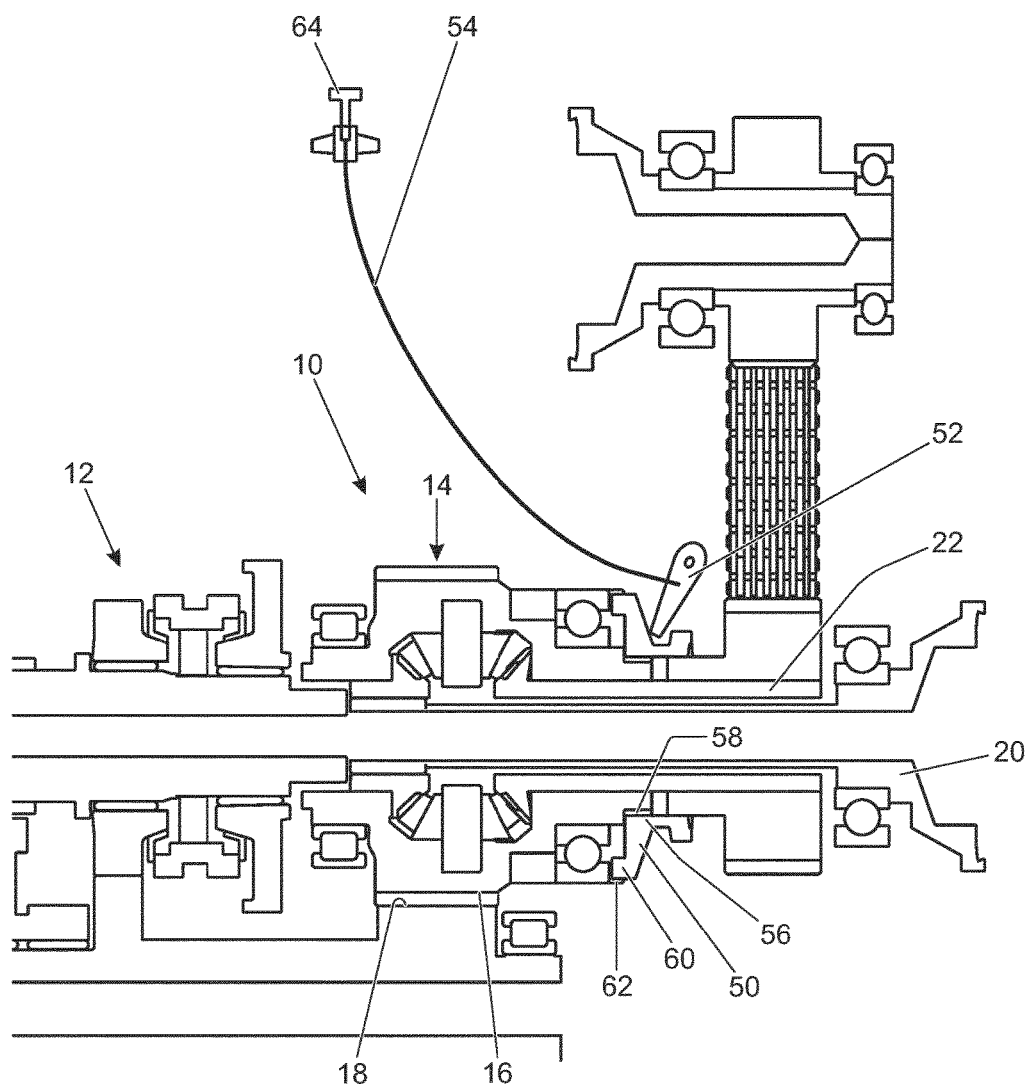
FIG. 6 shows a park lock apparatus according to another embodiment of the invention.

FIGS. 4 to 6 show a transfer box and part of a transmission as per FIGS. 1 to 3. Accordingly the features of those components are as per FIGS. 1 to 3. However, the park pawl and dog lock are replaced in FIGS. 4 to 6 by an integrated transfer and transmission lock 50 which serves to lock and unlock the transfer box differential 14 and the transmission 12. In an example embodiment, the integrated lock takes the form of a dog gear 50 movable by a selector fork 52, which is in turn movable by a Bowden cable 54. In other arrangements, the Bowden cable may be replaced by an actuator that moves the selector fork. This is discussed further below.

Features of the integrated lock 50 are described in the following with reference to use of the integrated lock 50.

FIG. 4 shows an unlocked configuration where the dog gear 50 is in a first position surrounding the front output shaft 22. A first set of teeth 56 disposed on the dog gear 50 are free to move and do not mesh with any component of the transfer box or transmission. As such, the differential 14 of the transfer box 10 is unlocked in the configuration of FIG. 4. Furthermore, the output gear 18 of the transmission is free to rotate.

FIG. 5 shows the dog gear 50 moved to a second position where the first set of teeth 56 engage corresponding teeth 58 coupled to the ring gear 16 of the differential. Accordingly, the dog gear locks the rotational relationship of the output shaft 22 to the ring gear 16 and in turn to the other output shaft 20. Therefore, in the second position, the differential, and thus the transfer box, is locked.

FIG. 6 shows the dog gear 50 moved to a third position where the first set of teeth 56 remain engaged with the corresponding teeth 58, and a second set of teeth 60 of the dog gear 50 engage with a park gear 62 fixed to the transmission casing, for example. Other fixing positions are within the scope of the invention. Engagement of the second set of teeth 60 with the park gear therefore prevents movement of the ring gear, which prevents movement of the output shafts 20, 22 of the transfer box.

As mentioned above, the dog gear 50 is moved by the selector fork 52 which is moved by, for example, tensioning the Bowden cable 54 or moving an actuator (not shown). In the example of movement by the Bowden cable 54, the cable 54 is connected to a lever 64 positioned inside the vehicle as per FIGS. 1 to 3. In the example of movement by the actuator, a switch control or similar is positioned inside the vehicle. The switch or the lever has three positions or settings that correspond to each of the positions of the dog gear. The integrated park and differential lock is advantageous because it reduces the mechanical parts required to lock both the transmission and the transfer box.

The embodiment of FIGS. 1 to 3 may also comprise an actuator in place of the Bowden cable. In some arrangements, the embodiment of FIGS. 1 to 3 may comprise an actuator on each of the park pawl and the dog gear. In those arrangements, a controller is provided to ensure engagement of the dog gear before engagement of the park pawl.

In example embodiments of the invention, the park lock apparatus, described in relation to FIGS. 1 to 6, comprises a control unit configured to facilitate correct operation of the park lock. The control unit comprises a sensor or sensors, which may be part of existing vehicle systems or supplemental thereto, arranged to determine vehicle parameters such as, for example, the speed of the transmission output shaft, the speed of the rear wheel drive shaft, and/or the speed of the vehicle. Determined parameters are processed by a processor to determine whether or not it is safe to move between states of the park lock apparatus through, for example, actuation of the actuator. In an example embodiment, the control unit only permits locking of the differential when it is determined that both sides of the differential are rotating at the same speed. In an example embodiment, the control unit only permits engagement of the park lock when the vehicle is stationary.

For purposes of this disclosure, it is to be understood that the controller(s) and control unit(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. As used herein, the term "vehicle control unit" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

In each of the embodiments mentioned, the movement of the park lock apparatus from the first or second to the second or third positions may be spring loaded. This is particularly advantageous in the situation where the park lock apparatus baulks because, for example, the teeth of a dog gear do not engage. Through spring loading, the park lock apparatus can move between positions when it is mechanically permitted to do so without baulking.

The skilled person will appreciate that the foregoing embodiments may be applied to vehicles having automatic or manual transmissions.

According to an embodiment of the invention, there is provided a selector for use by a driver of a vehicle to move between conditions of the park lock apparatus. In an example embodiment the selector comprises a lever movable between three positions, each relating to one of differential and park lock disengaged, differential engaged only, and differential and park lock engaged.

In some, but not necessarily all examples, a transfer unit may be switchable between two-wheel drive and four-wheel drive modes, such that the first state comprises two-wheel drive mode permitting motive power to be transferred only to the front or rear drive shaft of the vehicle, and the second state comprises a four-wheel drive mode permitting motive power to be transferred to both of the front and rear drive shafts of the vehicle.

Aspects and embodiments of the invention may be defined according to the following numbered paragraphs:
1. A park lock apparatus for a vehicle, the apparatus comprising:
   a locking member having:
      a first state arranged to permit independent rotational movement of front and rear drive shafts of the vehicle relative to a fixed position on the vehicle;

a second state arranged to prevent independent rotational movement of the front and rear drive shafts of the vehicle relative to the fixed position on the vehicle; and a third state arranged to prevent rotational movement of the front and rear drive shafts of the vehicle relative to the fixed position on the vehicle, and an actuation member for moving the locking member between the first, second and third states.

2. A park lock apparatus as defined in paragraph 1 for a vehicle having a gearbox connected to a differential for transferring rotational movement from the gearbox to front and/or rear drive shafts, the locking member comprising a dog gear movable between a first position and a second position to permit and prevent relative movement of the front and rear drive shafts to move between the first and second states respectively, and a park pawl movable between a first position and a second position to permit and prevent rotational movement of the differential relative to the gearbox to move between the first or second state and the third state respectively.

3. A park lock apparatus as defined in paragraph 1 for a vehicle having a gearbox connected to a differential for transferring rotational movement from the gearbox to front and/or rear drive shafts, the locking member comprising a dog gear movable between a first, second and third position each corresponding to the first, second and third states respectively, wherein:

in the first position the dog gear permits relative movement of the front and rear drive shafts;

in the second position the dog gear prevents relative movement of the front and rear drive shafts;

in the third position the dog gear prevents:
relative movement of the front and rear drive shafts; and
relative movement of the differential and the gearbox.

4. A park lock apparatus as defined in paragraph 1, wherein the actuation member comprises an actuator connected using a connection to the locking member.

5. A park lock apparatus as defined in paragraph 4, wherein the connection comprises a Bowden cable.

6. A park lock apparatus as defined in paragraph 1 for a vehicle having a gearbox connected to a differential for transferring rotational movement from the gearbox to front and/or rear drive shafts, the apparatus comprising a control unit arranged to:

determine relative movement of the first and second drive shafts;

permit movement of the locking member from the first to the second state in dependence on the determined relative movement of the first and second drive shafts;

determine relative movement of the differential to the gearbox;

permit movement of the locking member from the second state to the third state in dependence on the determined relative movement of the differential to the gearbox.

7. A park lock apparatus as defined in paragraph 6 for a vehicle having a gearbox connected to a differential for transferring rotational movement from the gearbox to front and/or rear drive shafts, wherein movement of the locking member from the first state to the second state is permitted when there is substantially no relative movement of the first and second drive shafts.

8. A park lock apparatus as defined in paragraph 6 for a vehicle having a gearbox connected to a differential for transferring rotational movement from the gearbox to front and/or rear drive shafts, wherein movement of the locking member from the second state to the third state is permitted when there is substantially no relative movement of the differential and the gearbox.

9. A vehicle comprising:
a gearbox connected to a differential for transferring rotational movement from the gearbox to front and/or rear drive shafts; and
a park lock apparatus having the features of the park lock apparatus as defined in any one of paragraph 1 to 8.

The invention claimed is:

1. A vehicle park lock apparatus, the apparatus comprising:
at least one locking member having:
a first state in which the at least one locking member is arranged such that a differential is unlocked and a park lock is disengaged to permit independent rotational movement of front and rear drive shafts relative to a fixed reference position;
a second state in which the at least one locking member is arranged to lock the differential to prevent independent rotational movement of the front and rear drive shafts relative to the fixed reference position, and in which the park lock is disengaged; and
a third state in which the at least one locking member is arranged such that the differential is locked and the park lock is engaged to prevent rotational movement of the front and rear drive shafts relative to the fixed reference position, and
an actuation member for moving the at least one locking member between the first, second and third states, the actuation member being movable between three positions, each position associated with one of the first state, the second state, and the third state, wherein the at least one locking member cannot be moved from the first state to the third state without first being moved to the second state to lock the differential.

2. A vehicle park lock apparatus as claimed in claim 1, wherein each of the first and second states permits motive power to be transferred from a transmission to both of the front and rear drive shafts of the vehicle.

3. A vehicle park lock apparatus as claimed in claim 1, wherein the actuation member comprises a lever.

4. A vehicle park lock apparatus as claimed in claim 1, comprising
a gearbox connected to the differential for transferring rotational movement from the gearbox to at least one of the front and rear drive shafts;
the at least one locking member comprising a dog gear movable between a first position and a second position to permit and prevent relative movement of the front and rear drive shafts to move between the first and second states, respectively; and
a park pawl movable between a first position and a second position to permit and prevent rotational movement of the differential relative to the gearbox to move between the first or second state and the third state, respectively.

5. A vehicle park lock apparatus as claimed in claim 1, comprising
a gearbox connected to the differential for transferring rotational movement from the gearbox to at least one of the front and rear drive shafts,
the at least one locking member comprising a dog gear movable between a first, second and third position each corresponding to the first, second and third states respectively, wherein:
in the first position the dog gear permits relative movement of the front and rear drive shafts;

in the second position the dog gear prevents relative movement of the front and rear drive shafts;
in the third position the dog gear prevents:
relative movement of the front and rear drive shafts; and
relative movement of the differential and the gearbox.

6. A vehicle park lock apparatus as claimed in claim 1, wherein the actuation member comprises an actuator connected by a connection to the at least one locking member.

7. A vehicle park lock apparatus as claimed in claim 6, wherein the connection comprises a Bowden cable.

8. A vehicle park lock apparatus as claimed in claim 1, comprising
a gearbox connected to the differential for transferring rotational movement from the gearbox to at least one of the front and rear drive shafts, the apparatus comprising a control unit configured to:
determine relative movement of the front and rear drive shafts;
permit movement of the at least one locking member from the first to the second state in dependence on the determined relative movement of the front and rear drive shafts;
determine relative movement of the differential to the gearbox;
permit movement of the at least one locking member from the second state to the third state in dependence on the determined relative movement of the differential to the gearbox.

9. A vehicle park lock apparatus as claimed in claim 8, wherein movement of the at least one locking member from the first state to the second state is permitted when there is substantially no relative movement of the front and rear drive shafts.

10. A vehicle park lock apparatus as claimed in claim 8, wherein movement of the at least one locking member from the second state to the third state is permitted when there is substantially no relative movement of the differential and the gearbox.

11. A control unit arranged to control the vehicle park lock apparatus as claimed in claim 1, the control unit being operable to control movement of the at least one locking member between the first, second and third states, in response to user actuation of the actuation member.

12. A vehicle comprising the vehicle park lock apparatus as claimed in claim 1 and a gearbox connected to the differential for transferring rotational movement from the gearbox to at least one of the front and rear drive shafts.

13. A vehicle comprising the control unit of claim 11 and a gearbox connected to the differential for transferring rotational movement from the gearbox to at least one of the front and rear drive shafts.

* * * * *